United States Patent
Bouchard et al.

(10) Patent No.: US 7,814,310 B2
(45) Date of Patent: Oct. 12, 2010

(54) IPSEC PERFORMANCE OPTIMIZATION

(75) Inventors: Gregg A. Bouchard, Round Rock, TX (US); Richard E. Kessler, Shrewsbury, MA (US); Muhammad R. Hussain, Pleasanton, CA (US)

(73) Assignee: Cavium Networks, Santa Clara, CA (US)

( * ) Notice: Subject to any disclaimer, the term of this patent is extended or adjusted under 35 U.S.C. 154(b) by 1329 days.

(21) Appl. No.: 10/411,967

(22) Filed: Apr. 12, 2003

(65) Prior Publication Data

US 2004/0205332 A1    Oct. 14, 2004

(51) Int. Cl.
    *H04L 29/06* (2006.01)
(52) U.S. Cl. .................. 713/153; 713/160; 713/189; 726/13
(58) Field of Classification Search .............. 713/153, 713/160–161, 189, 179; 709/235–236, 223–224, 709/230, 238; 726/13–14; 370/338, 356
    See application file for complete search history.

(56) References Cited

U.S. PATENT DOCUMENTS

| | | | | |
|---|---|---|---|---|
| 5,151,899 A | * | 9/1992 | Thomas et al. ............. | 370/394 |
| 6,253,321 B1 | * | 6/2001 | Nikander et al. ........... | 713/160 |
| 6,327,625 B1 | | 12/2001 | Wang et al. | |
| 6,708,218 B1 | * | 3/2004 | Ellington et al. ........... | 709/236 |
| 6,725,371 B1 | * | 4/2004 | Verhoorn et al. ........... | 713/161 |
| 7,181,612 B1 | * | 2/2007 | Pellacuru et al. ........... | 713/153 |
| 2002/0188839 A1 | * | 12/2002 | Noehring et al. ........... | 713/153 |
| 2003/0014627 A1 | * | 1/2003 | Krishna et al. ............. | 713/153 |

OTHER PUBLICATIONS

PCT/US04/09835, Jan. 19, 2005, International Search Report.
PCT/US04/09835, Jan. 19, 2005, Written Opinion.

* cited by examiner

*Primary Examiner*—Thanhnga B Truong
(74) *Attorney, Agent, or Firm*—Blakely, Sokoloff, Taylor & Zafman LLP

(57) ABSTRACT

A method and apparatus for optimizing IPsec processing by providing execution units with windowing data during prefetch and managing coherency of security association data by management of security association accesses. Providing execution units with windowing data allows initial parallel processing of IPsec packets. The security association access ordering apparatus serializes access to the dynamic section of security association data according to packet order arrival while otherwise allowing parallel processing of the IPsec packet by multiple execution units in a security processor.

26 Claims, 11 Drawing Sheets

IPSEC PERFORMANCE OPTIMIZATION

BACKGROUND

1. Field of the Invention

The invention relates to the field of network processing. Specifically, this invention relates to the optimization of IPsec packet processing through increased parallelism in processing and removing serialized processing bottlenecks.

2. Background

Communication networks and the number of users of such networks continue to increase. On-line sales involving both business-to-business and business to consumer communication over the Internet continues to proliferate. Additionally, the number of people that are telecommuting continues to grow. Both on-line sales and telecommuting are examples of the usage of communication networks that typically involve private and sensitive data that needs to be protected during its transmission across the different communication networks.

Accordingly, security protocols, (e.g., Transport Layer Security (TLS), Secure Sockets Layer (SSL) 3.0, Internet Protocol Security (IPsec), etc.), have been developed to establish secure sessions between remote systems. These security protocols provide a method for remote systems to establish a secure session through message exchange and calculations, thereby allowing sensitive data being transmitted across the different communication networks to have a measure of security and/or untamperability.

These security protocols utilized encryption to protect the content of the messages sent between machines and network devices. In some instances, it is necessary that a network device handling a message decrypt at least a portion of the message in order to process the message, such as determining the message destination. Decryption algorithms often require significant processing resources. This puts a strain on network processor in a network device. A network processor often receives incoming packets from a framer, which is a device that translates an incoming signal over a physical medium into a predefined format or frame.

IPsec is a security framework for Internet Protocol (IP) networking that provides security services, including access control, integrity, authentication, protection against replay, confidentiality and similar services. IPsec utilizes a security association (SA) to implement its services. An SA is a simplex connection that is protected by one or more of the security services. An SA may be established between a pair of hosts, between a host and a security gateway, such as a router, or between a pair of gateways. In a further embodiment, nested or bundled IPsec, IP in IP or similar packet configurations are identified as unsupported configurations and forwarded to an exception port. An SA contains all the information required to execute the security services of a IPsec packet. When created, an SA is assigned a security parameters index (SPI) by a receiving machine. A combination of the SPI and the destination IP addresses uniquely identifies an SA. A receiving host uses this information to determine which SA an incoming IPsec packet belongs to, and thus which algorithms for, decryption and packet processing to apply to the packet. On the transmit side, the host performs a lookup based on the IP header information to find the SA to be used for encryption and packet processing.

IPsec utilizes a sequence number stored in a 32 bit format within each IPsec packet to verify or authenticate decrypted packet data by comparison with a Integrity Check Value encrypted within the packet. IPsec also utilizes the sequence number to track packets of a particular SA that have been processed thereby allowing for anti-replay checks that determine if a packet has been processed and prevent 'spoofing' of an IPsec packet by detecting packets whose sequence numbers have already been processed or are outside a defined range or 'window.'

IPsec packets include a 32 bit sequence number. However, IPsec also supports 64 bit sequence numbers in security associations. Thus, when an IPsec packet is examined to determine its sequence number a conversion is necessary to translate the 32 bit sequence number in the packet into a 64 bit sequence number for processing in connection with a security association.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
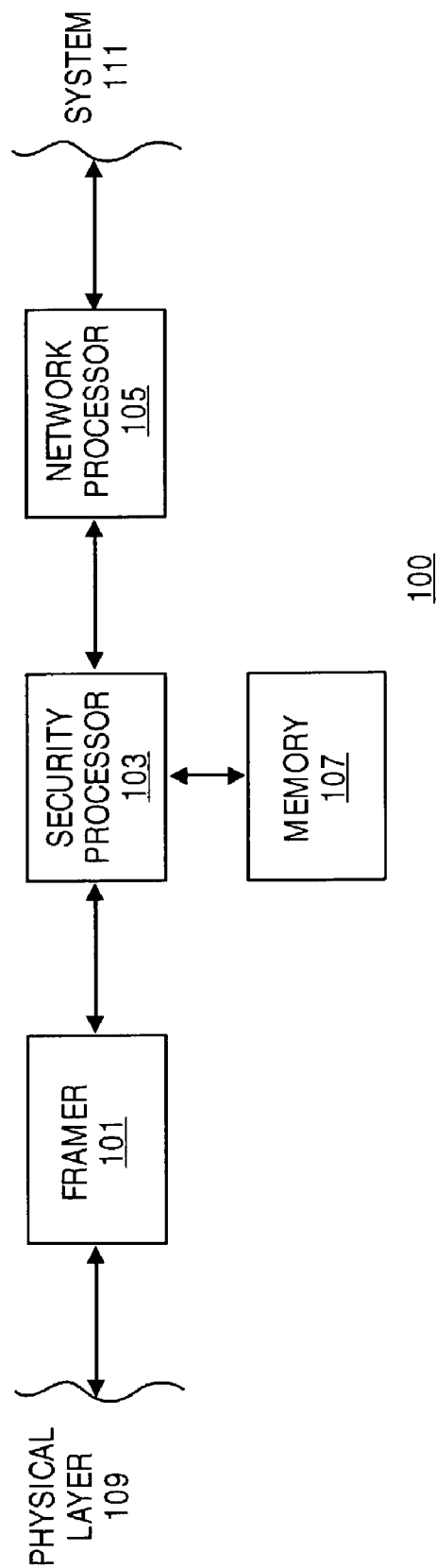
FIG. 1 is a block diagram of a networking device.

FIG. 1 is a block diagram of one embodiment of a network device 100. In one embodiment, network device 100 includes a framer device 101 connected to a physical layer 109 such as Ethernet, token ring or similar network. Framer 101 can transmit or receive frames over the physical layer connection 109. Framer 101 is directly connected to security processor 103. Security processor 103 receives packet from framer 101 and examines them to determine if they contain encrypted data that needs to be decrypted before being passed on to the network processor 105. Security processor 103 is connected to a set of memory devices 107. Memory device 107 may function as a working memory for performing operations and storing data relating to the processing of packets. In another embodiment, security processor 103 is a coprocessor to a network processor 105.

Network processor 105 examines incoming packets to determine if they need to be forwarded and receives packets that are outbound via physical connection 109. Network processor 105 maybe connected via a bus 111 or similar communication medium to a switch fabric in a network device. In another embodiment, network processor maybe part of a network interface for a computer system or similar system.

Inbound packets flow from the framer 101 into the security processor 103. Security processor 103 decrypts the packets if necessary and forwards the packets to network processor 105. Outbound packets often flow from the network processor 105 to the security processor 103, which encrypts the packet. Security processor 103 then forwards the encrypted packet to framer 101 to transmit over physical layer 109.

Security processor 103 can handle multi-port system packet interfaces (SPI interfaces) with the framer 101 and network processor 105. Security processor 103 can perform IPv4 and IPv6 transformations including IPv4 and IPv6 ESP/AH, UDP-encapsulated ESP, tunnel and transport. Security processor 103 can perform IPsec exception detection and accumulate statistics of traffic and processing in security processor 103. Security processor 103 may be used half-duplex or full duplex. In one embodiment, another network processor is placed between the security processor 103 and framer 101, for example to do segmentation and reassembly (SAR) with an asynchronous transfer mode (ATM) device.

When handling IPsec traffic, security processor 103 utilizes complete security association (SA) information that comes from either of two sources the request header of an input packet, which can specify the complete security association context directly and from the security parameters index (SPI) value in an inbound packet on an IPsec decrypt that destination matches. In IPsec, cryptographic context information is required per security association. The SA context data may contain secret keys needed for symmetric encryption and authentication as well as information about replay, time to live, statistics and sequence numbers.

In order to improve performance of IPsec traffic, security processor 103 provides a set of execution units to allow for parallel processing of IPsec packets. Parallel processing is achieved through tracking of packet arrival order and SA stream flows through processor 103. This enables processor 103 to maintain packet arrival order and SA stream flow order upon transmission or output while optimizing the processing of packets in a parallel and out of order system within processor 103. Parallel processing capabilities are also expanded by reducing the level of serialization required in packet processing. One serialization bottleneck in processing IPsec traffic is the calculation of a sequence number for each packet. This typically required that a prior packet be processed to determine its sequence number before a subsequent packet could be processed.

Figure 2A:
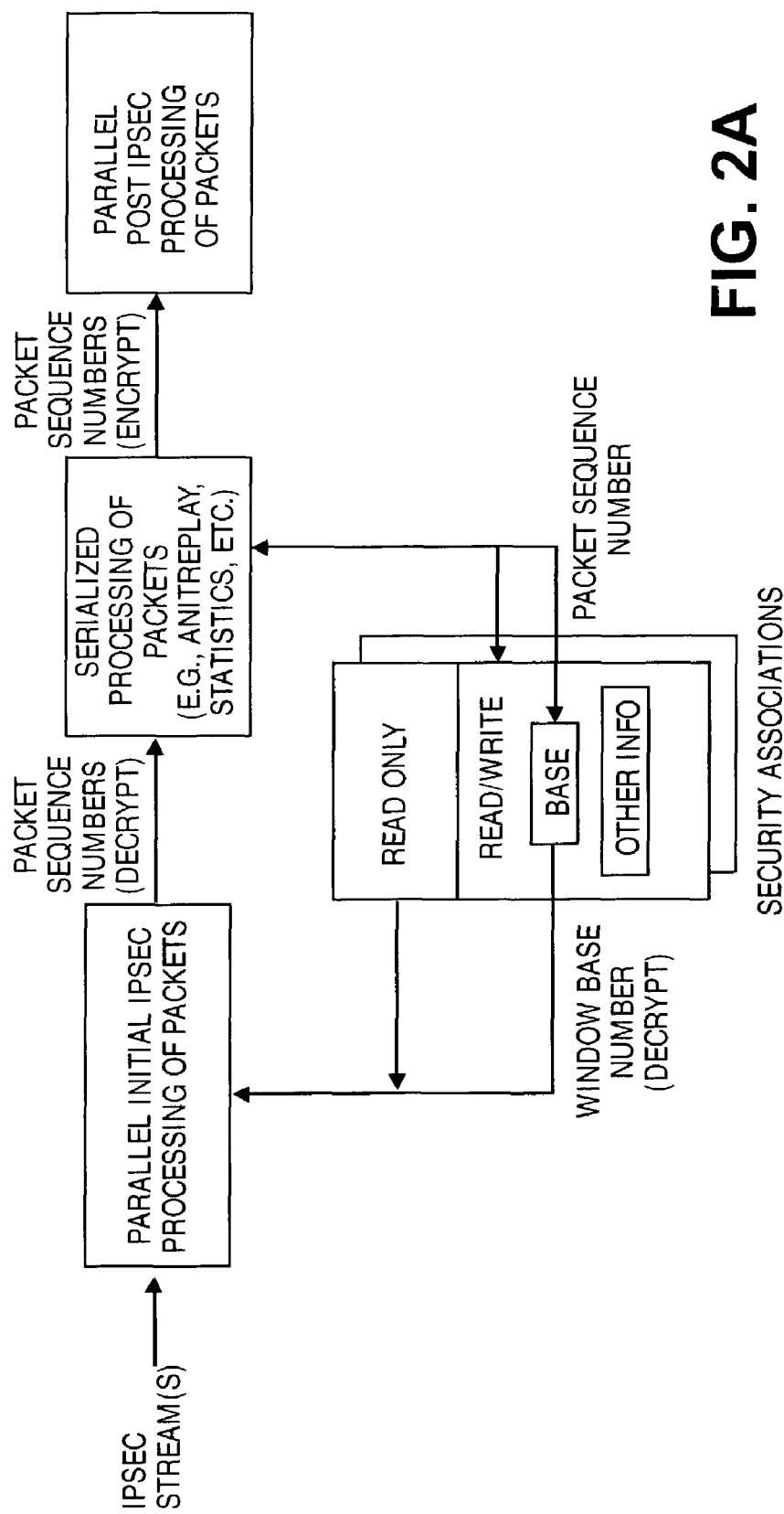
FIG. 2A is a diagram demonstrating parallel processing and reduced serialization in IPsec processing.

FIG. 2A is a diagram of a system that facilitates improved IPsec processing performance. Individual IPsec streams (i.e., sets of packets) each are associated with a security association and security association context data that is divided between read only data and read write data. Read only data contains static security association data. The read write data is dynamic data that changes as packets of the security association are processed. Incoming packets are processed as resources become available. When a packet is decrypted, the sequence number for each packet is generated in order to verify decryption or authenticate a packet. The sequence number is generated by use of a base window number provided from the read write data of a security association. Decryption of the packet also involves use of read only data in the initial phase but not read write data other than the base window number. Security associations track a window for reception of packets based on their sequence numbers. During encryption, a window base number is not provided in the initial parallel processing, rather read only data is supplied and used.

A packet received whose number falls outside this range is discarded or results in an exception. The window base number is a sequence number of a packet with a known relationship to the window. The window size is also a predetermined value. The decryption tasks that are most resource demanding and processing intensive are done in the initial parallel processing stage, including sequence number generation/reconstruction, decryption, authentication and Integrity Check Value verification. Similarly, the most processor intensive operations during an encryption process are done in the parallel stage, including encryption and Integrity Check Value generation.

Once a sequence number for a packet has been generated and initial processing of a packet has been completed, any requisite serialized processing may be undertaken. Such serialized processing requires access to read write data (and may also require read only data) from the security association, e.g., anti-replay checks, statistics accumulation and SA lifetime checks. During this serialization process for decryption the sequence number of the packet is 'returned' to the security association to allow the tracking of the window to be updated. In one embodiment, the window base number is the sequence number of the highest verified packet to enter the serialization stage. In this embodiment, a returned packet sequence number is compared to the old window base number to determine if it is higher and therefore should replace the old window base number. During encryption the post processing is supplied a sequence number by the serialization stage. In one embodiment, the serialization stage involves a single access request to SA data or a single set or requests.

After this serialization stage has completed, parallel processing of the packets of a particular IPsec stream may continue. This system increases IPsec processing speed by allowing increased parallel processing of packet data and minimized serialized processing of packets.

Figure 2B:
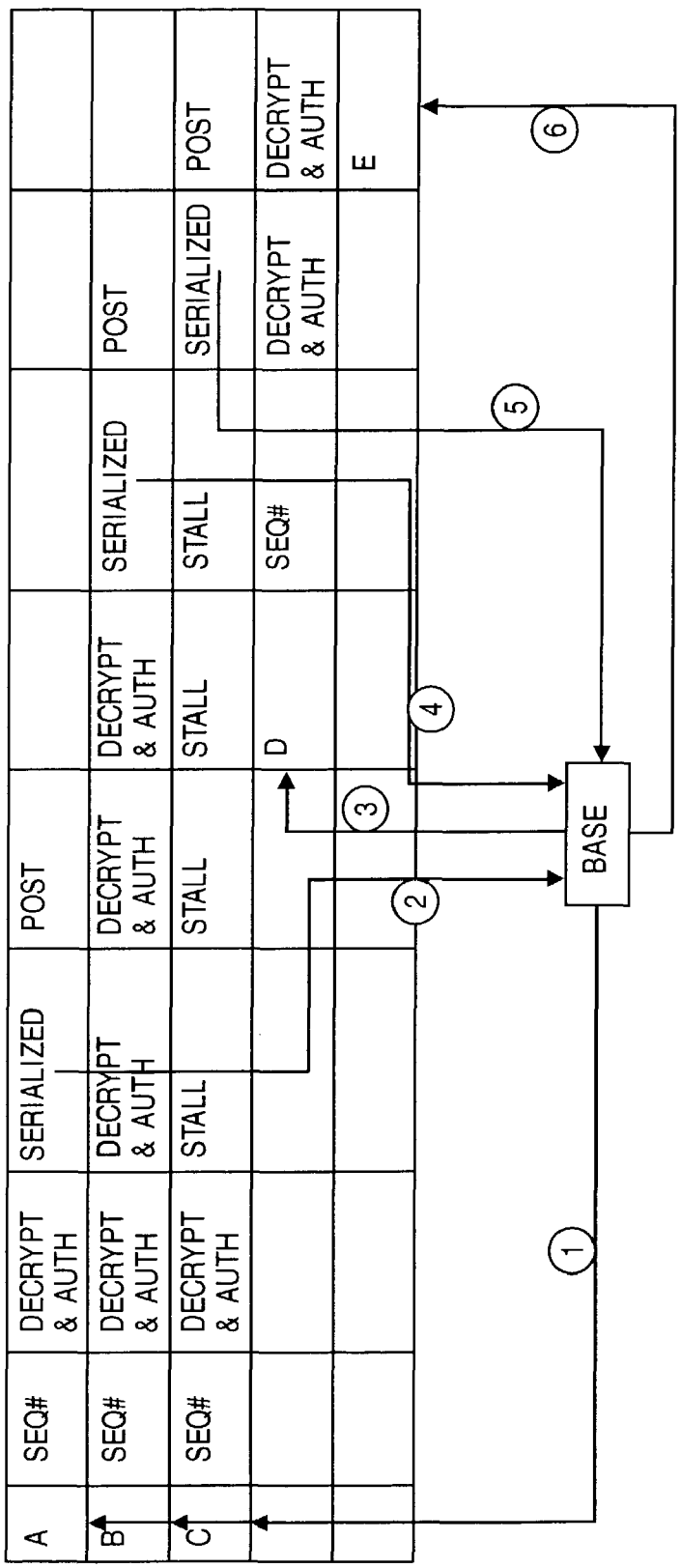
FIG. 2B is a diagram of an exemplary processing sequence that illustrates window base number distribution and updating.

FIG. 2B is a diagram illustrating an exemplary processing flow of five IPsec packets in a single IPsec stream including the provision of window base numbers to each. Packets A, B and C are each scheduled at approximately the same time and each receives the same window base number. Each packet progresses (from left to right in FIG. 2B) to a parallel processing stage in the form of decryption and authorization including the generation of the sequence number for each packet. Packet A concludes its parallel stage and enters a serialization phase and then completes any post processing. During A's serialization stage it supplies its sequence number to be used as a potential new window base number. Packet B follows a similar path but has an elongated parallel processing stage. Packet C completes its parallel processing stage before B, but must stall before it can complete its serialization stage until B completes its serialization stage. Packet D is scheduled after the serialization stage of A and may receive a different window base address than A, B, and C. Similarly, E may receive a different window base number because B and C have also completed their serialization stages. Numbers 1-6 indicate an exemplary sequence of window base address distribution and updating. In another embodiment, when processing packets using decryption, serialization is not according to packet order arrival. Serialization may be according to any defined packet order or may only limit simultaneous access to an SA or similar resource.

This parallel system processing packets enabled by security processor 103 may require 'atomic operations' to maintain data coherency during processing of packets. Atomic operations are those operations requiring a specific sequencing in terms of the order in which data is processed thereby maintaining data in a known or coherent state at all times and preventing errors that may occur due to multiple or out of sequence access and modification to data.

Figure 2C:
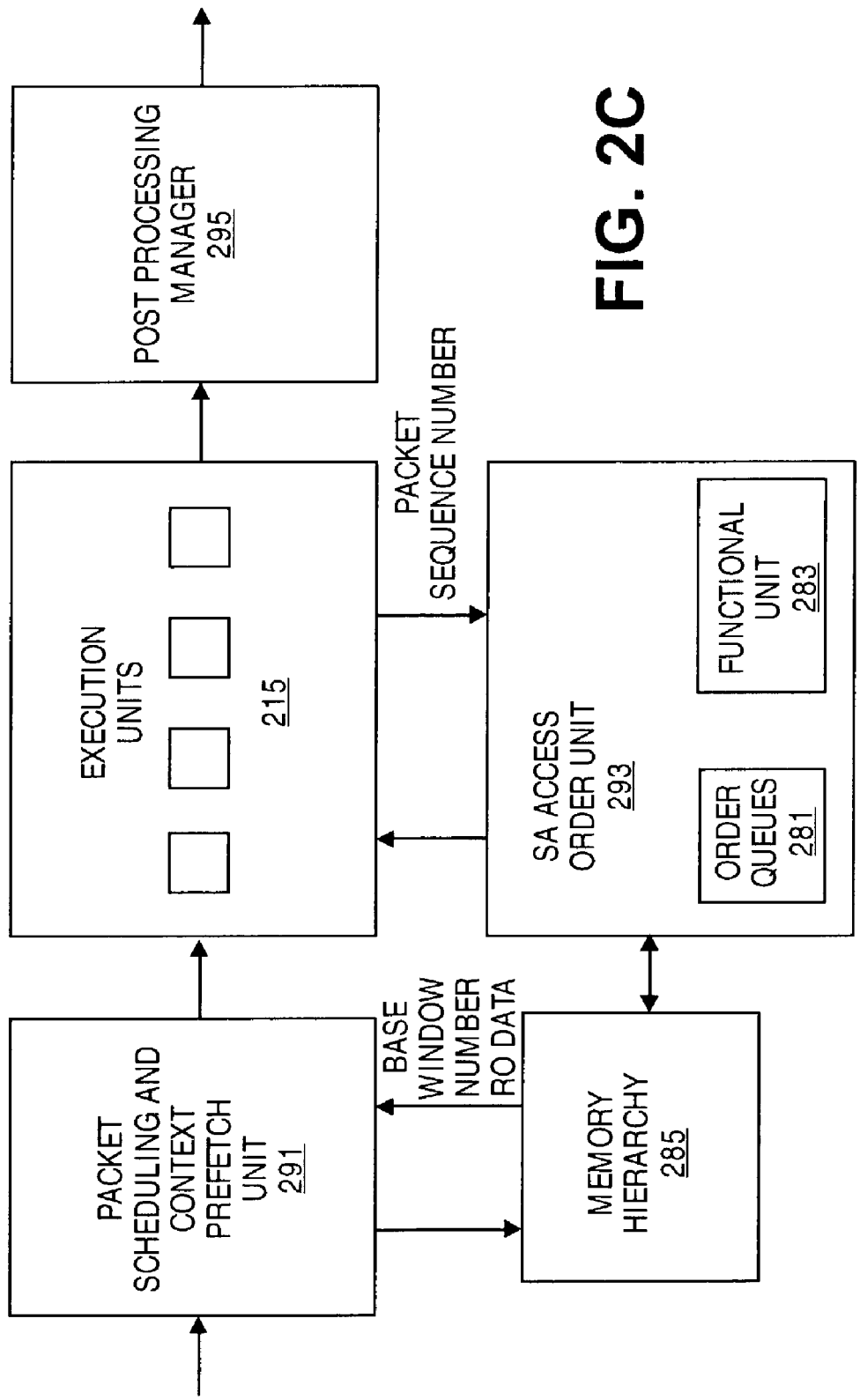
FIG. 2C is a functional block diagram of an IPsec processing system.

FIG. 2C is a functional block diagram for the optimization of IPsec processing in a security processor 103 or similar device. In one embodiment, security processor 103 includes a scheduling and context prefetch unit 291. Scheduling unit 291 receives network traffic requiring processing such as decryption, encryption, packet analysis, packet modification or similar operations and assigns the packet to an execution unit 215 in order to carry out the needed operation. Execution unit 215 may be a single or set of processors capable of general or specialized processing of packets and packet related data.

In one embodiment, at or near the time of execution unit scheduling context data, e.g. data related to the processing of a particular packet or set of packets that may be stored external to the packet, e.g. security association information for IPsec, may be prefetched from a storage device. In one embodiment, context data is fetched from a memory external to security processor 103 and then stored locally in a memory hierarchy 283. Context data may be stored locally in any part of a security processor 103 or external to the processor. In one embodiment, memory hierarchy is a set of layered caches and memory devices. In another embodiment, the memory hierarchy 285 may include an external storage device. In a further embodiment, the memory hierarchy 285 includes a single local memory device. In another embodiment, prefetch is not a part of the scheduler 291. Rather, context data is fetched as needed by an execution unit or by other specialized security processor 103 logic.

In one embodiment, security association (SA) access ordering unit 293 stores context data in a memory hierarchy 285. Prefetch unit 291 at the time of execution unit assignment determines if a fetched context associated with a packet to be processed has already been accessed or is in use by another execution unit. Ordering unit 293 manages an internal set of order queues 281 to track the execution units that have been assigned to work on a packet association with a given context. In one embodiment, ordering unit 293 tracks execution units 215 in packet arrival order, adding an identifier for an execution unit to the tail of a queue designated for tracking execution unit order for a particular context or SA.

In one embodiment, when an execution unit 215 encounters an operation for a packet requiring sequential access to context data or a similar resource it issues an atomic operation request to ordering unit 293. Ordering unit 293 services requests if the requesting execution unit 215 is at the head of an order queue 281 or is otherwise indicated by a similar tracking mechanism as the next execution unit to be serviced for sequential accesses to resources managed by unit 293. The sequence number of the packet is included in the request and used to update the window base number depending on the windowing scheme employed. In one embodiment, ordering unit 293 may have its own functional unit 283 or logic circuitry for processing atomic operation requests. In another embodiment, ordering unit 293 may include logic to support requests from execution unit 215. In a further embodiment, atomic operation handling may be distributed over multiple components including execution unit 215, ordering unit 293 and other hardware of security processor 103 such as specialized registers or logic.

In one embodiment, when an execution unit 215 completes work with a packet it notifies the ordering unit 293 in order to remove that execution unit from the tracking mechanism of the order unit 293. In another embodiment, execution unit makes a single request to ordering unit 293, which removes the execution unit 215 from its queues 281 after servicing the request. Order unit 293 also updates its order queues 281 or tracking mechanisms to indicate the next execution unit 215 to be serviced. Processed data and packets from execution unit 215 are forwarded for post processing such as header and trailer information updating and transmission by post processor unit 295.

Figure 2D:
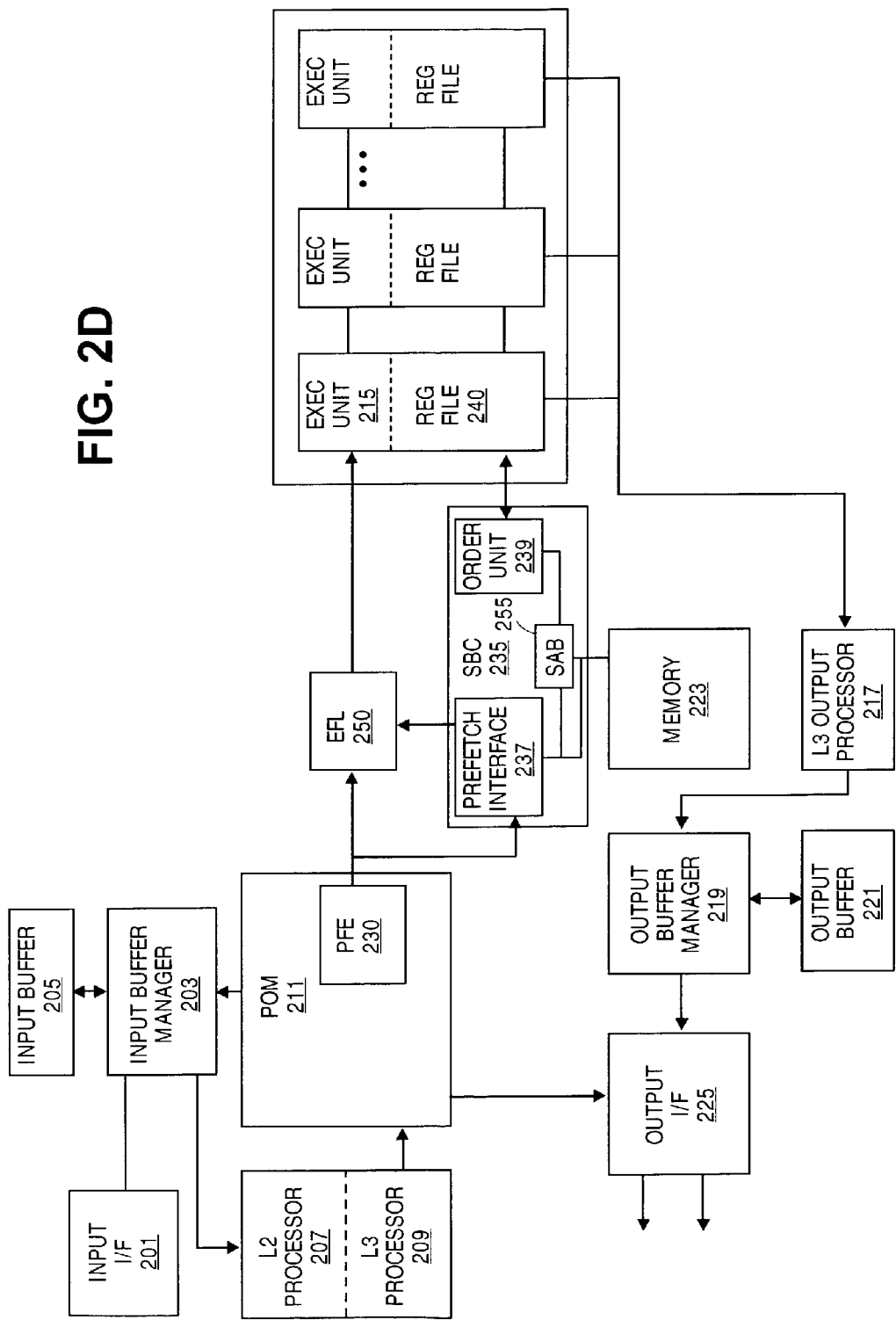
FIG. 2D is a block diagram of an exemplary security processor.

FIG. 2D is a block diagram of an exemplary security processor 103. Incoming packets are received by exemplary security processor 103 through an input interface 201 from physical connection 109. Input interface 201 forwards incoming packet data to input buffer manager 203. Input buffer manager 203 stores the incoming packet in input buffer 205. In one embodiment, input buffer manager 203 forwards a portion of an incoming packet to level 2 (L2) processor 207. In another embodiment, input buffer manager 203 forwards a pointer or tag identifying the packet to L2 processor 207. In another embodiment, a packet may be stored in any storage medium or location to be accessed subsequently for further processing.

L2 processor 207 parses the header information of an incoming packet. L2 processor 207 determines if the incoming packet has any level 2(data link layer from the Open System Interconnection (OSI) model) type headers or encapsulation. L2 processor 207 forwards the pointers it received to the level 3(L3) processor 209 along with any level 2 information it has discovered. L3 processor 209 determines if the packet contains IP and IPsec header information within it. If IPsec data is detected within a packet this information along with other data accumulated for the related packet is forwarded to the packet order manager (POM) 211. Packets that do not contain IP or IPsec data are forwarded to the POM 211 to be sent to an appropriate destination port. L3 processor 209 also extracts an SA index from the packet to pass onto POM 211. In another embodiment, L2 and L3 parsing may be done by a single unit or by a general purpose unit, including an execution unit.

POM 211 maintains relative order in the processing of packet data throughout security processor 103. Packets identified through data obtained by the L2 processor 207 and L3 processor 209 as containing IPsec data to be decrypted are scheduled to be processed by an execution unit 215 via an execution feed logic (EFL) component 250. Other packets are forwarded to the output interface 225 to be sent out on a destination port or an exception port. POM 211 stores the information about the packet that is in the input buffer 205, such as a pointer or address of the packet or portion thereof in the input buffer 205 together with the information gathered from L2 processor 207 and L3 processor 209. In another embodiment, scheduling and loading of packets and related data for an execution unit 215 may be done by a general scheduling unit or similar unit.

POM 211 works with EFL 250 and SA write buffer complex (SBC) 235 to schedule packets for processing with execution units 215 and to provide execution units with the information needed to process a packet. SBC 235 manages the SA context data for IPsec processing. POM 211 initiates the process of retrieving SA context data through prefetch subcomponent 230. Prefetch component 230 sends a request for SA context data to SBC 235 when preparing to assign a packet to an execution unit 215. SBC 235 handles requests from POM 211 and execution units 215 that involve the use of SA context data. The requests from execution units 215 are atomic operation requests which are operations involving SA data for use in IPsec processing such as anti-replay window checks, sequence number checks and SA lifetime checks.

Security processor 103 maybe used to process a wide variety of packet related operations including various forms of encryption and decryption schemes, e.g., IPsec, SSL, and similar schemes. These operations may require access to shared resources that require sequential access by a specified order, i.e., packet arrival order. POM 211, SBC 235, EFL 250 and execution units 215 or analogous structures may implement management for resources associated with packet processing including specialize operations such as encryption/decryption and similar security operations.

EFL 250 receives packet data such as header pointer data from POM 211 related to the packet to be processed by an execution unit 215. EFL 250 loads this data along with packet payload data into the register file 240 associated with the execution unit 215. EFL 250 also receives SA context data from SBC 235 after the prefetch is complete. In one embodiment, SA context data is categorized as read only (RO) and read-write (RW) data. A copy of RO SA data may be forwarded via EFL 250 to the execution unit 215 processing a packet using the SA. The RO data is then stored in the register file 240 of the execution unit 215 as well as in a SA write buffer (SAB) 255 of SBC 235. RW data is stored in SAB 255 and access to this dynamic data is made through atomic operation requests by the execution unit 215 as needed. In one embodiment, when RO data is retrieved from SAB 255 or memory 223 the window base number is also retrieved and sent to the EFL 250 to be stored in register 240 allowing execution unit 215 to correctly generate a sequence number for the packet. In one embodiment, the window base number is adjacent in memory/address space to the RO data facilitating its retrieval in connection with RO data.

When data associated with an SA is no longer needed by any execution unit 215 the SA context data may be written back to context memory 223. The data written back is the RW data stored in the SAB 255. RO data does not change and may be discarded by SAB 255 and execution unit 215. This system allows multiple execution units 215 to access as much SA context data as possible in parallel and maintain the coherency of the dynamic data of the SA.

As mentioned, SBC 235 includes SAB 255, which stores SA data for all packets that are being processed by execution units 215. SBC 235 also includes an SA order unit that maintains per-SA order lists to ensure that multiple execution units working on packets for the same SA are serviced in packet arrival order or similar predetermined order for proper processing operation. In another embodiment, SA data or similar data is partially or entirely stored in SBC 235 or locally in processor 103.

SAB 255 assists in maintaining data coherency and SA ordering for correct IPsec operation. Updates to SA data are done in SAB 255 and are kept coherent with other SA fetch requests that may hit or miss SAB 255. In one embodiment, security processor 103 supports direct memory accesses to context storage device 223 by execution units 215. SAB 255 in coordination with SBC 235 maintains coherency of SA data between the SAB 255 contents and SA data stored in context storage memory 223 by controlling the sequencing of all SA context data access in context storage memory 223. Requests for SAB operations may come from several sources including POM 211 and execution units 215. In one embodiment, requests are handled in a round robin scheme or similar scheme.

POM 211 will issue a SA prefetch request to SBC 235 along with a paired allocation message indicating the execution unit 215 assigned to process an IPsec packet. The POM request and allocation messages are always paired although not transmitted simultaneously. In one embodiment, the POM request message includes an SA index for a packet to be processed. The POM allocation includes a corresponding execution unit identification number for the execution unit 215 that has been assigned to process the packet. In one embodiment, a POM SA prefetch request is issued early to allow SBC 235 to fetch from context memory 223 SA context data while the POM waits for an execution unit 215 to become available. When an execution unit 215 becomes available then the allocation message is sent to SBC 235. This allows parallel selection of an execution unit 215 and prefetch of SA context data.

POM 211 may also support processing of general operations for packets passing through security processor 103. In some instances the general operations require that packet order execution be maintained similar to SA related operations. POM 211 and SBC 235 support these operations by treating these general operations as though related to a common SA. These general ops will be assigned a common SA index and handled by SBC 235 like SA operation requests thereby providing in order execution of the general operations carried out by an execution unit 215 on a packet.

Execution unit 215 decrypts or encrypts a packet by applying the IPsec transforms according to RFC 2401 and adjusts the L2 header and trailer information to reflect the new length of the packet after decryption or encryption. Execution units 215 include a register file 240 for storing packet data and SA data for the processing of the packet. Execution units 215 use atomic operations to offload some IPsec processing which requires 'atomic' and 'ordered' access to SA context data. An atomic operation is generated by and is schedule for processing within SBC 235. Once an atomic operation has been serviced, SBC 235 returns a response or status packet to the requesting execution unit 215. When an execution unit 215 has finished processing an IPsec packet it releases the SA by issuing a 'release' atomic operation to the SBC. In one embodiment, execution unit 215 issues multiple atomic operation requests while processing an IPsec packet. In another embodiment, an execution unit issues a single large atomic operation, which bundles multiples atomic operations into a single request.

In one embodiment, execution units 215 are micro-coded engines that support many cryptographic primitives, including direct hardware support for symmetric encryption algorithms such as DES/3DES, AES and RC4, direct support for MD5 and SHA-1 cryptographic hash algorithms and asymmetric encryption algorithms such as RSA. In another embodiment, execution units are customized to execute particular protocols such as IPsec. Execution units 215 may also utilize layer three parsed information to determine packet processing requirements. Execution units 215 may use portions of context storage 223 as scratch memory to process an input packet.

In the event of errors in handling atomic operation requests an execution unit 215 may timeout and report the error to SBC 235. SBC 235 will force a release of SA context data from the execution unit 215, which has been taken offline. All execution units 215 that time out are considered to be 'incoherent' and their atomic operations are blocked. SBC 235 will send response packets indicating the error to the execution unit 215. If an execution unit 215 is recovered then a clear command must be issued to clear any out of date state information regarding execution unit 215 in SBC 235. In one embodiment, a timeout counter is maintained by SBC 235 in connection with an SAB entry. This counter is initialized when the SAB entry is first created and reinitialized when a new request from the POM 211 has a matching SA index.

During processing of an IPsec packet, execution unit 215 may discover that a processed packet includes nested or bundled IPsec segments, IP in IP or similar packet configurations that require additional processing by an execution unit. In one embodiment, execution unit 215 may continue processing the packet if the same SA is used by the nested or bundled segments. Execution unit 215 notifies SBC 235 of subsequent segment information. In another embodiment, execution unit 215 may send the partially processed packet information back to POM 211 and store processed data in the output buffer 221 to restart the prefetch and execution unit selection system. In a further embodiment, nested or bundled IPsec, IP in IP or similar packet configurations are identified as unsupported configurations and forwarded to an exception port.

In one embodiment, Execution unit 215 forwards packet information to a level three (L3) output processor and forwards processed packet data to output buffer manager 219 for storage in output buffer 221. L3 output processor checks and verifies IP and IPsec header information in a processed packet. L3 output processor may check a decrypted or encrypted packet to determine if special circumstance apply that require further processing of a packet, such as IP in IP encapsulation, and similar scenarios where the packet requires additional processing. Packets requiring further processing have their pointer and tag information forwarded to POM 211. In a further embodiment, nested or bundled IPsec, IP in IP or similar packet configurations are identified as unsupported configurations and forwarded to an exception port.

Output buffer manager 219 stores packets or packet pointer and tag data in output buffer 221 while output buffer manager 219 waits for availability of output interface 225 for transmission of the packet over physical medium 109. In one embodiment, output buffer manager 219 or output interface 225 works in conjunction with POM 211 or similar structure to schedule packets to be transmitted in packet arrival order, IPsec flow order or similar defined order. Transmitting packets in packet arrival order or IPsec flow order allows the security processor 103 to minimize processing to reorder packets by receiving devices and makes security processors 103 functionality largely transparent.

Figure 3:
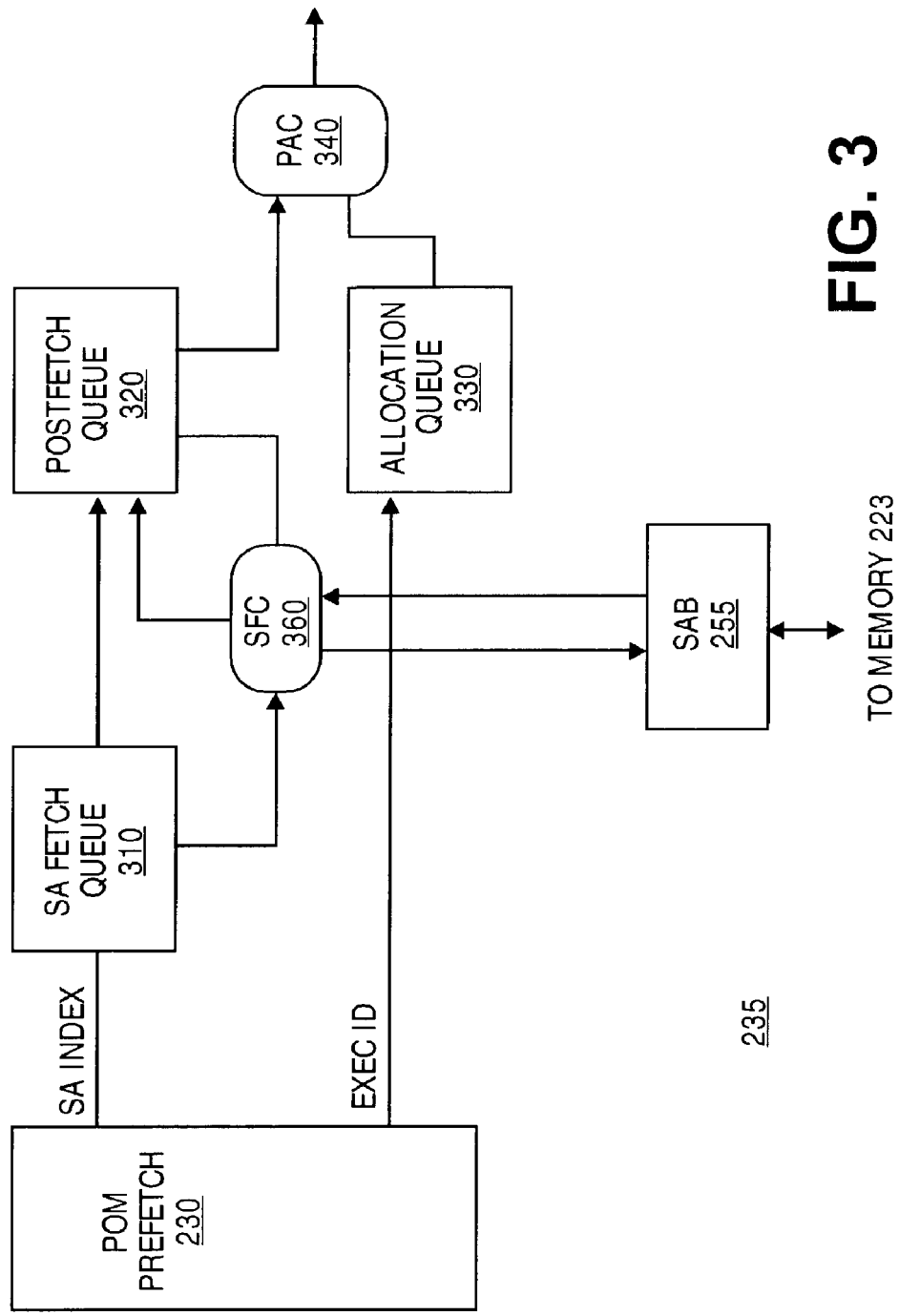
FIG. 3 is a block diagram of an exemplary security association prefetch interface.

FIG. 3 is a block diagram of an exemplary interface of SBC 235 to the POM prefetch unit 230. The interface includes an SA fetch queue 310. SA fetch queue 310 receives SA indices from POM prefetch interface 230 associated with packets to be processed by an execution unit 215 as part of an SA prefetch request. The SA index is stored in the queue 310. SA fetch controller (SFC) 360 examines the SA index at the head of queue 310 to determine if the SA context information designated by the SA index is in the SAB 255. If the SA context information designated by the SA index is present in SAB 255 then SFC 360 forwards the SA index to post-fetch queue 320. If the SA context information related to the SA index is not in SAB 255 then SFC waits until SAB 255 creates a new entry in SAB 255 for the SA context before forwarding the SA index to the post-fetch queue. SFC also stores whether the initial fetch to SAB 255 was a hit or miss with the SA index in the post-fetch queue 320.

POM prefetch unit 230 also sends an execution unit identification number (exec ID) after a packet has been assigned to the allocation queue 330. Each exec ID has a paired SA index. Exec IDs and SA indices are sent to the interface in matching order, i.e., the order in which packets were received by security processor 103. POM allocation controller (PAC) 340 is responsible for updating the SA order unit 293 based on data in the POM allocation queue 330 and post fetch queue 320.

In addition, the SBC interface maintains SAB 250 coherence by tracking pending reads and writes to context storage memory 223. If an SAB miss occurs, an entry is created in SAB 255 and a memory request is made to context storage memory 223. The pending read is tracked until the memory access is complete. If an SAB hit occurs and there are no pending reads or writes to context storage memory 223 then SA context data is returned from the SAB entry to SFC 360 and EFL 250. However, if there are pending reads or writes then the return of SAB entry information is stalled until these conditions are cleared. This ensures that the EFL 250 receives SA context data in POM request order and that a release operations to write back SA data to memory completes before an SA fetch is issued for the same SA index.

Figure 4:
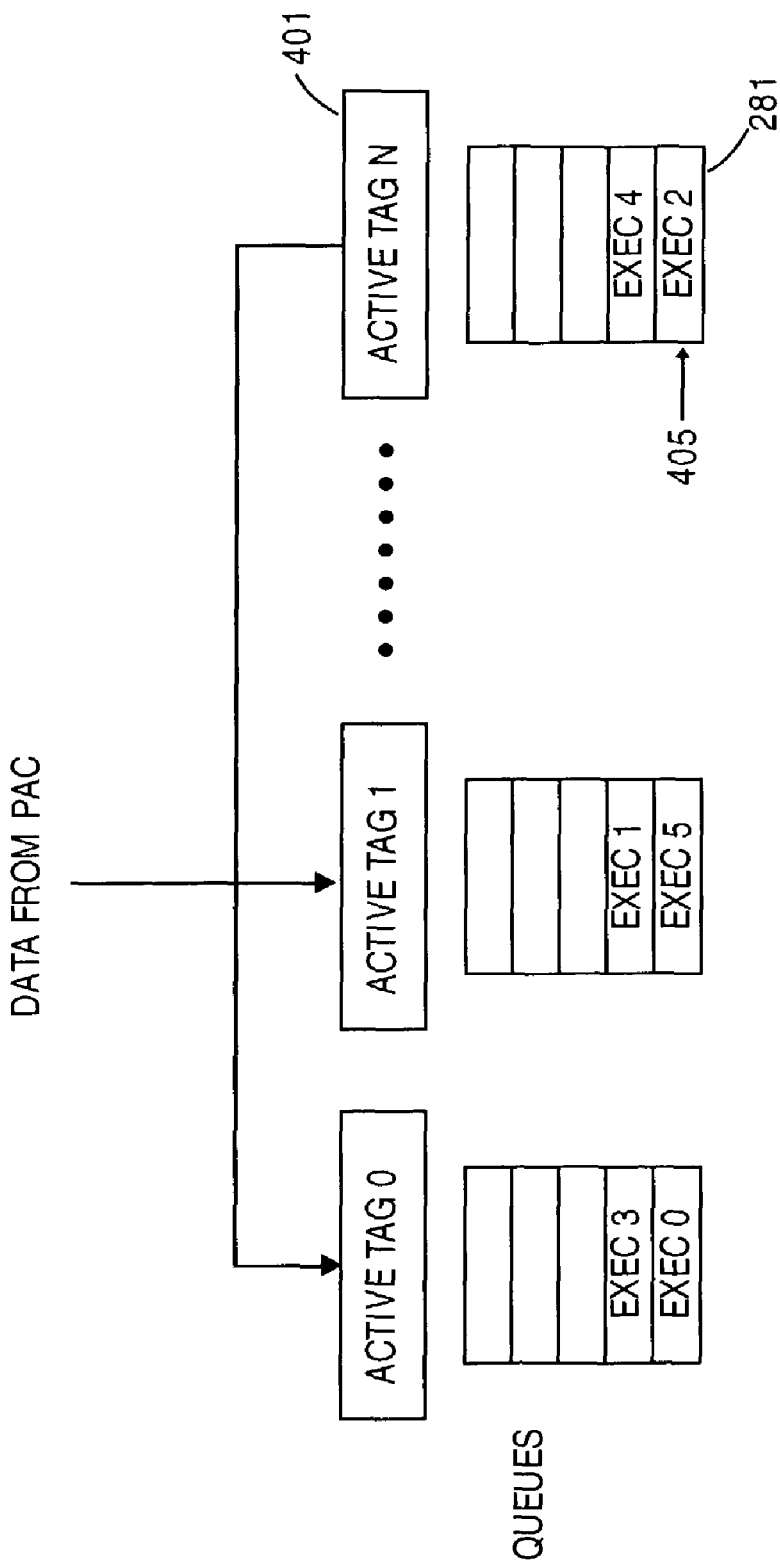
FIG. 4 is a diagram of an exemplary security association ordering unit.

FIG. 4 is a diagram of an exemplary set of ordering queues 281 in an SA ordering unit 293. An SA ordering mechanism is required to ensure that multiple packets for the same SA are serviced in packet arrival order for proper SA processing. As multiple packets arrive for the same SA, they can be assigned to different execution units, which can then later make 'out of order' requests with respect to their packet arrival order for the common SA data housed in SAB 255. As such a per-SA ordering mechanism is required to track the execution units for a given SA in their packet arrival order, so that requests to access SA context data by an execution unit 215 can later be serviced in the packet arrival order.

SA order unit 293 includes a set of queues 281 each associated with a tag 401. SA order unit tracks the order of processing requests for operations utilizing SA context data. Each tag 401 designates an individual queue 281 as being associated with a particular SA. PAC 340 sends data to SA order unit 293 to update the queues 281 and tags 401. When an SA is placed in SAB 255 an unused queue 281 is designated for tracking execution units that are processing packets utilizing the SA in packet arrival order. The queue 281 is identified by the tag 401 of queue 281. In one embodiment, tag 401 identifies the SAB 255 entry where the SA context information is stored.

PAC 340 also sends data to order unit 293 when an SAB context entry exists in SAB 255. In this case, PAC 340 provides an exec ID of an execution unit 215 that has been assigned to process a packet utilizing an SA tracked by a queue 281 in the SA order unit 293. PAC 340 also provides this information for newly designated queues 281 after an SAB 255 entry is created. SA order unit 293 also tracks the head 405 for each queue 281. If an exec ID is at the head 405 of a queue 281 then the atomic operation request from the corresponding execution unit 215 is ready to be serviced by SAB 255. Multiple serviceable entries may be present in SA order unit 293. In one embodiment, a round robin scheme or similar scheme is used to process serviceable entries in multiple queues 281.

1 In one embodiment, there are an equal number or greater of queues 281 than SAB 255 entries. This ensures that there will always be an open or available queue 281 when needed. Likewise, there may be more queues 281 and SAB 255 entries than execution units 215 in order to ensure that there is always sufficient number of queues 281 and SA entry spaces in SAB 255 to handle each SA associated with a packet assigned to an execution unit 215. In one embodiment, there are thirty two queues 281, thirty two SAB entry spaces and twenty four execution units.

If a timeout occurs for an execution unit 215 in a queue 281, then a timeout error message is returned to that execution unit from SBC 235 and each execution unit referenced in the same queue 281 that is in a position to be processed after the timed out execution unit is also issued an time out error message. Once each error message has gone out the queue 281 is released. In one embodiment, processing of the packet associated with the timeout error will be abandoned. In another embodiment, the processing of packet maybe restarted and the execution unit 215 that caused the error may be taken offline.

Figure 5:
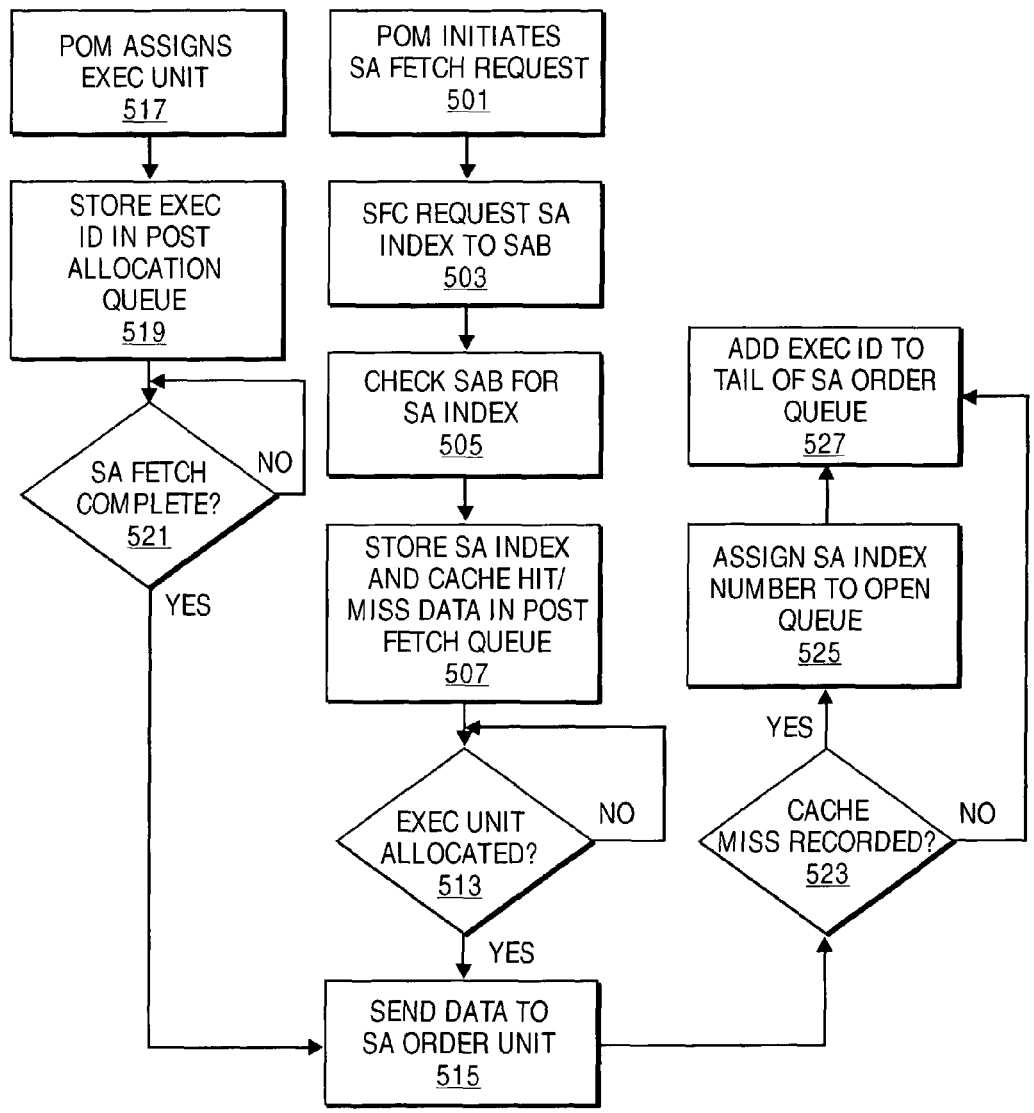
FIG. 5 is a flowchart for the function of a security association access ordering unit for handling incoming packet assignments and security association caching.

FIG. 5 is a flowchart of the function of the prefetch system. POM prefetch unit 230 initiates a SA fetch request 501 (block 501). This request is queued in SA fetch queue 310. In one embodiment, SA fetch queue 310 employs a credit debit system or similar flow control system to prevent overruns from POM prefetch unit 230 requests. SFC 360 sends a request to SAB 255 (block 503) to determine if SAB 255 contains the requested SA context data (block 505). If there is a cache miss then the SAB entry number returned from SAB 255 is recorded in a post-fetch queue 320 along with a flag or indicator that an initial cache miss occurred (block 507). Likewise, if a cache hit is returned, the SAB entry number and a flag or indicator that a cache hit occurred are recorded in the post-fetch queue 320.

Independently POM prefetch unit 230 forwards an exec ID (block 517) to be stored in allocation queue 330 (block 519). The exec ID corresponds to the SA index sent to the SA fetch Queue 310. SA indices and exec IDs are each sent to the interface of SBC 235 in packet arrival order relative to other SA indices and exec IDs. Thus, an SA index and exec ID set will be sent to the interface in the same order, but not necessarily at the same time. For example an SA index may be sent to the interface before an execution unit has been assigned. No other exec ID will be sent to the interface until the corresponding exec ID is sent in order to maintain arrival order of packet in SA processing. PAC 340 checks if the SA number at the head of queue 320 has a corresponding exec ID at head of queue 330 (block 521 and 513). When both are ready information based on their content is sent to the SA order unit 293 (block 515).

This information includes whether a cache miss or hit occurred (block 523). If a cache miss occurred then the SAB index is assigned as a tag 401 to an unused queue 281 in the SA order unit 293 (block 525). In one embodiment, SAB maintains a linked list of free queues 281. Then the corresponding exec ID is added to the tail of the queue 281 having a tag matching the SA entry number (block 527). Likewise, if a cache hit occurred the exec ID is added to the tail of queue 281 that has a tag corresponding to the SA index (block 527).

Interface of SBC 235 also protects against denial of service attacks. The SBC interface protects against malicious attackers that may spoof the SA index/SPI value in a packet. SA context data integrity must be protected as well as performance levels of the security processor 103. When an SA fetch is generated SBC will perform a series of checks to prevent denial of service and similar attacks. These checks limit SA fetch request sizes and monitor minimum SA fetch sizes. This prevents resource misallocation that could lead to performance degradation and hangs of execution units. Subsequent SA fetch size requests are checked in case partial fetches of SA context data are made, then the remainder of the SA data may be fetched.

Figure 6:
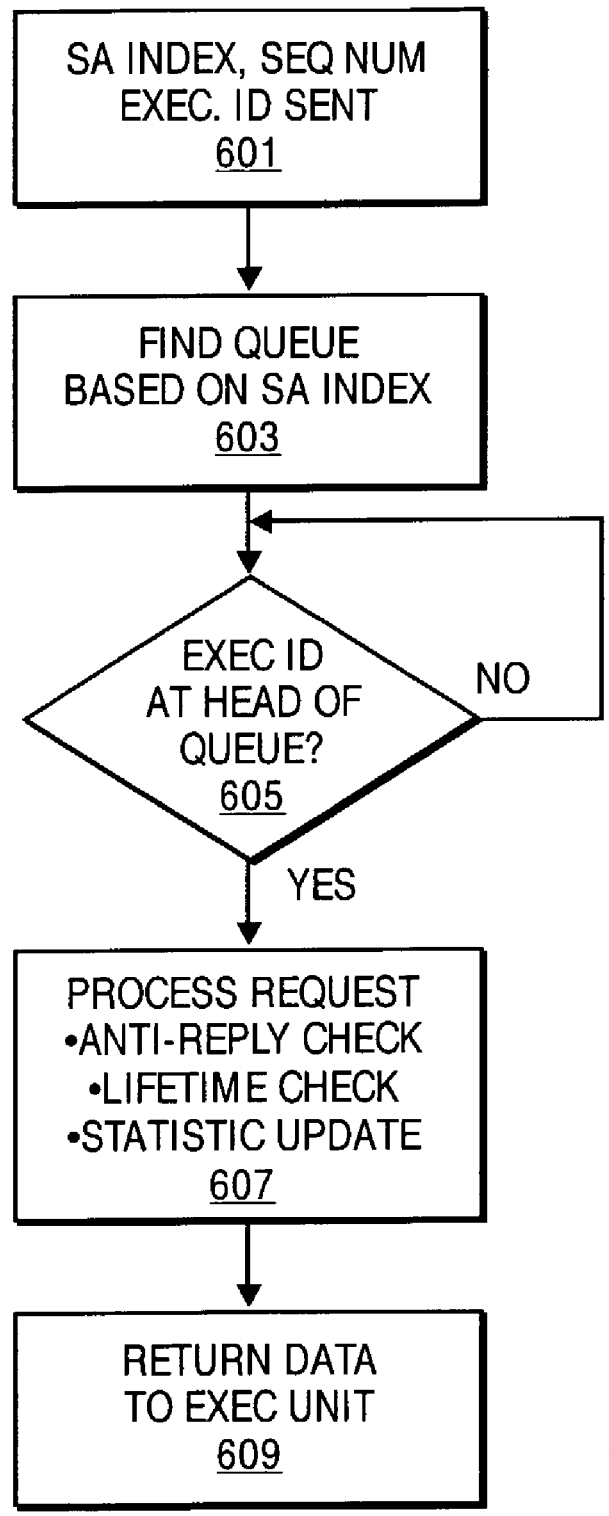
FIG. 6 is a flowchart for handling execution unit atomic operation requests.

FIG. 6 is a flow chart of the function of SBC 235 when handling atomic operation requests from an execution unit 215. Execution unit 215 sends an SA index, sequence number and exec ID to the SBC 235 when making a request for an atomic operation (block 601). Atomic operations are operations that the execution unit 215 needs to carry out that require SA information or modification. The SBC 235 checks the queues 281 in the SA order unit 293 to determine if the exec ID is at the head 405 of queue 281. If the exec ID is not found at the head of the corresponding queue 281 identified with a tag 401 corresponding to the SA index (block 603) provided by the execution unit 215 then the SBC stalls the execution unit 215. The execution unit 215 must wait until it is at the head of the queue (block 605).

When the exec ID reaches the head 405 of queue 281 then the requested operation is processed by SBC 235. Typical operations of the execution unit 215 involve decryption and encryption of IPsec packets utilizing a particular SA whose context data is controlled by SBC 235. SBC services requests by execution unit to perform anti-reply checks by tracking the sequence numbers of packets that have been processed, lifetime checks for the SA and the tracking of statistics related to the SA (block 607). This data is stored in the SA context managed by SBC. SBC updates this information or checks this information and returns any relevant information to the execution unit 609. The exec ID remains at the head of the queue until a 'release' operation is requested by the execution unit 215 at which time the corresponding exec ID is removed from queue 281 and the queue 281 is updated so that the next exec ID moves to the head 405 of queue 281. If the exec ID is the last in queue 281 when the release operation is received then the queue 281 becomes available for reassignment and the SBC 235 writes the SA context data back to context memory 223.

Figure 7:
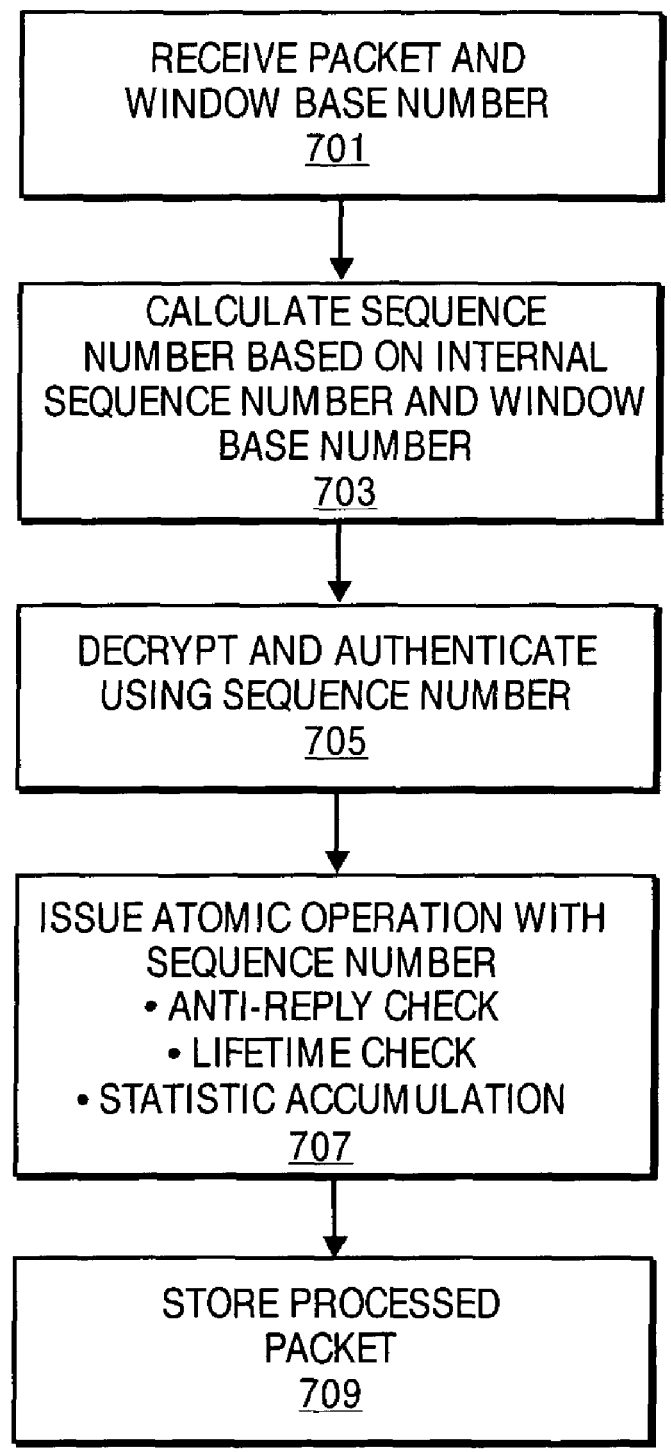
FIG. 7 is a flowchart for the decrypting of a packet by an execution unit.

FIG. 7 is a flowchart of the operation of an execution unit 215 in decrypting an IPsec packet. An execution unit 215 receives packet data, SA RO data and a window base number data from EFL 250 (block 701). Execution unit 215 uses the 64 bit window base number and the 32 bit sequence number in the packet to determine a full 64 bit sequence number for the packet (block 703). Execution unit 215 then decrypts and authenticates the decrypted packet using the full 64 bit sequence number (block 705). Execution unit 215 then issues atomic operation requests, e.g., anti-replay check, SA lifetime checks, and statistics gathering, to the SA access ordering unit 293 including the full 64 bit sequence number in the request (block 707). The sequence number submitted to the SA access ordering unit 293 is used to update its tracking of processed packets. After the atomic operation completes and returns any relevant data or message to the execution unit 215, the processed packet is forwarded for further processing or to be stored until transmitted (block 709).

In one embodiment, the conversion of a 32 bit sequence number by a execution unit requires a check to determine if a sequence number has 'rolled over' in relation to the window base number in order to convert it to a 64 bit number. Roll over is incrementing or decrementing the least significant digit of the upper 32 bits of a 64 bit number, eg. 0x00000000FFFFFFFF to 0x0000000100000000. In the case of calculating the upper 32 bits of a sequence number the upper 32 bits of a window base number can be used as it is or by adding or subtracting a 1 from its value. The determination of how to modify the upper 32 bits of the window base number to complete the packet sequence number, requires that the window size be compared with the window base number to determine the range of the window. If the window overlaps a boundary, where roll over occurs then the sequence number is compared to the lower 32 bits of the window base number and dependent on whether the sequence number is less than or greater than the window base number then the upper 32 bits can be decremented or incremented appropriately and appended to the sequence number to generate a 64 bit sequence number for use in verification, authentication and anti-replay checks.

When a 64 bit sequence number is reported to the SA access ordering unit 293, a anti-replay window is updated to mark the corresponding packet as being processed. In one embodiment, if the reported sequence number is the highest number reported then the window is shifted such that the new sequence number defines the upper bound of the window. In one embodiment, the execution unit 215 and ordering unit 293 implement the sequence number calculation and anti-replay check according to IETF Internet Draft for the IP Encapsulating Security Payload (ESP), April 2003.

Figure 8:
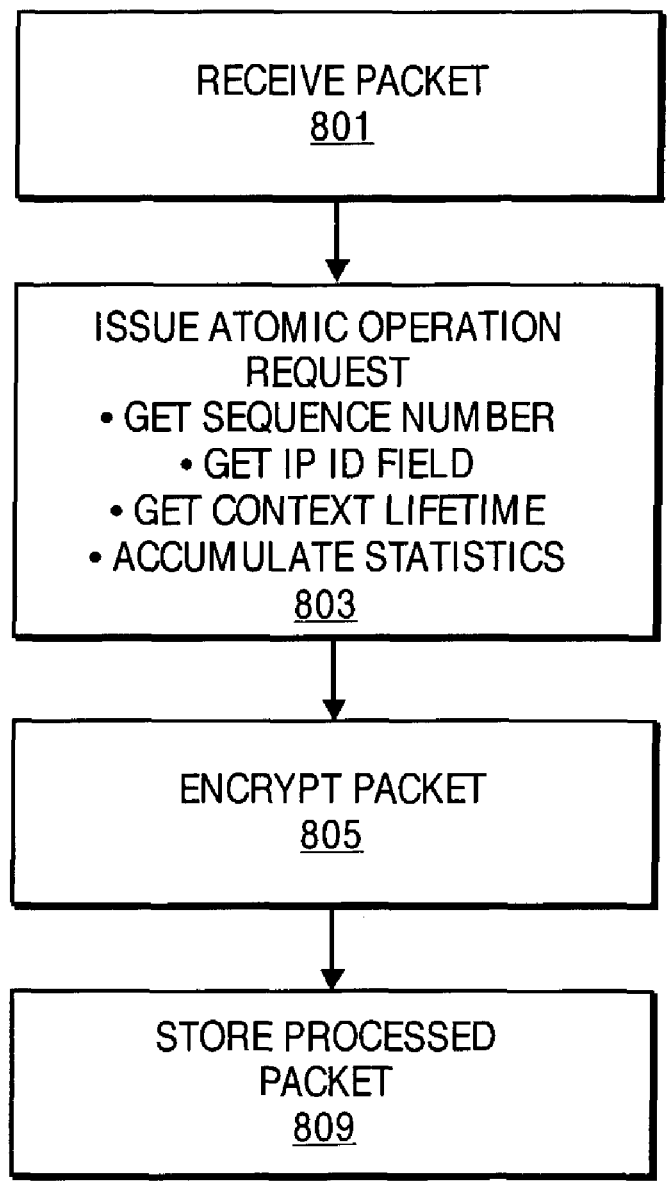
FIG. 8 is a flowchart for the encrypting of a packet by an execution unit.

FIG. 8 is a flowchart of the encryption process for an execution unit 215. Execution unit 215 receives a packet for processing along with SA RO data for processing (block 801). Execution unit 215 issues a request to ordering unit 293 (block 803). The request may include a request for a sequence number to be assigned to the packet being processed, a request for an IP identification field if IP tunneling mode is in use, an SA lifetime check, and global and local statistics gathering. Execution unit encrypts the packet (block 805) and stores the encrypted packet (block 809) for subsequent transmission.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

In one embodiment, a machine-readable medium that provides instructions, which when executed by a machine cause the machine to perform operations comprising: processing at least two Ipsec packets in parallel; requesting to access security association data; determining if a security association data access request is next to be processed according to Ipsec packet arrival order; and executing the security association data request. Determining if a security association access request is next to be processed includes checking if an execution unit number is at a head of a queue. The machine readable medium further comprises determining if the security association data is in a cache.

What is claimed is:

1. An apparatus comprising:
a first execution unit to process a first IPsec packet of a single IPsec stream including decryption, sequence number generation, and integrity check value verification, wherein the first IPsec packet is associated with a security association, and wherein the sequence number generation includes a generation of a first sequence number for the first IPsec packet through use of a window base number provided from the security association;
a second execution unit to perform the following:
process a second IPsec packet of the single IPsec stream including decryption, sequence number generation, and integrity check value verification in parallel with the processing of the first IPsec packet of the first execution unit, wherein the second IPsec packet is associated with the security association, wherein the sequence number generation includes a generation of a second sequence number for the second IPsec packet through use of the window base number provided from the security association, and
serially modify security association read-write data including a return of the second sequence number to the security association to be used as a potential new window base number for the single IPsec stream; and
a process order unit coupled with the first and second execution units to serialize writes to the security association read-write data for the first and second IPsec packets according to IPsec packet arrival order of the first and second IPsec packets.

2. The apparatus of claim 1, further comprising:
a scheduling system to assign the first IPsec packet to the first execution unit and the second IPsec packet to the second execution unit.

3. The apparatus of claim 1, wherein the process ordering unit includes a set of queues, each queue to track the processing order of IPsec packets associated with the security association.

4. The apparatus of claim 1, further comprising:
a cache to store security association data.

5. The apparatus of claim 1, further comprising:
a prefetch unit to provide the first execution unit with security association data.

6. The apparatus of claim 1, wherein the first execution unit is further to process a third IPsec packet of a different IPsec stream including encryption and integrity check value generation, and wherein the second execution unit further is to process a fourth IPsec packet of the different IPsec stream including at least encryption and integrity check value generation in parallel with the processing of the third IPsec packet of the first execution unit.

7. A method performed on a security processor comprising:
the security processor processing a first IPsec packet and a second IPsec packet of a single IPsec stream in a first parallel processing stage, the first parallel processing stage including decryption, sequence number generation, and integrity check value verification, wherein the first and second IPsec packets are associated with a security association and security association data; and
for each of the first and second IPsec packets, the security processor performing at least anti-replay checks and security association lifetime checks in a serialization processing stage, wherein the order of serialized processing is determined according to packet arrival order, and wherein the serialization processing stage includes,
requesting to access security association data,
determining if a security association data access request is next to be processed, and
executing the security association data access request.

8. The method of claim 7, further comprising:
determining if the security association data is in a cache.

9. The method of claim 7, further comprising:
storing a modified security association data when no IPsec packets are being processed.

10. The method of claim 7, further comprising:
updating the order of a security association process queue.

11. The method of claim 7, further comprising:
issuing a command to signal completion of processing the first IPsec packet associated with a security association.

12. The method of claim 7, wherein the determining if a security association access is next to be processed includes checking if an execution unit identification is at a head of a queue.

13. The method of claim 7, further comprising:
processing the first IPsec packet and the second IPsec packet in a second parallel processing stage after completion of the serialization processing stage.

14. The method of claim 7, further comprising:
processing a third IPsec packet and a fourth IPsec packet of a different single IPsec stream in a third parallel processing stage, the third parallel processing stage including encryption and integrity check value generation.

15. The method of claim 7, wherein the sequence number generation includes generating a first sequence number for the first IPsec packet and a second sequence number for the second IPsec packet through use of a window base number provided from the security association, wherein the serialization processing stage for the first and second IPsec packets further includes returning the first and second sequence numbers respectively to the security association.

16. An apparatus comprising:
a means for performing decryption, sequence number generation, and integrity check value verification for multiple IPsec packets of a single IPsec stream in parallel;
a means for requesting an access to context information to process a packet, wherein the context information includes at least a base window number;
a means for determining if a context information request is next to be processed according to packet order arrival, in order to serialize context information access; and
a means for executing the context information request.

17. The apparatus of claim 16, further comprising:
a means for determining if the context information is in a cache.

18. The apparatus of claim 16, further comprising:
a means for storing context information process order in a queue.

19. The apparatus of claim 16, further comprising:
a means for updating the order of a context information process queue.

20. The apparatus of claim 16, wherein the determining if a context information request is next to be processed includes checking if an execution unit tag is at a head of a queue.

21. A non-transitory machine-readable medium that provides instructions, which when executed by a machine cause the machine to perform operations comprising:
processing at least two IPsec packets of a single IPsec stream in a first parallel processing stage, the first parallel processing stage including decryption, sequence number generation, and integrity check value verification, wherein each IPsec packet is associated with a security association and security association data; and
for each of the at least two IPsec packets, performing at least anti-replay checks and security association lifetime checks in a serialization processing stage, wherein the order of serialized processing is determined according to IPsec packet arrival order, and wherein the serialization processing stage includes,
requesting to access security association data,
determining if a security association data access request is next to be processed, and
executing the security association data access request.

22. The machine readable medium of claim 21, further comprising:
determining if the security association data is in a cache.

23. The machine-readable medium of claim 21, wherein the determining if a security association access request is next to be processed includes checking if an execution unit number is at a head of a queue.

24. The machine-readable medium of claim 21, further comprising:
processing the at least two IPsec packets in a second parallel processing stage after completion of the serialization processing stage.

25. The machine-readable medium of claim 21, further comprising:
processing at least two other IPsec packets of a different single IPsec stream in a third parallel processing stage including encryption and integrity check value generation.

26. The machine-readable medium of claim 21, wherein the sequence number generation includes generating sequence number for each of the at least two IPsec packets through use of a window base number provided from the security association, wherein the serialization processing stage further includes returning each generated sequence number to the security association.

* * * * *